(12) United States Patent
Li et al.

(10) Patent No.: US 12,104,345 B2
(45) Date of Patent: Oct. 1, 2024

(54) WATER INTAKE PIPELINE STRUCTURE PASSING THROUGH SOFT FOUNDATION EMBANKMENT BELOW FLOOD LEVEL AND CONSTRUCTION METHOD

(71) Applicant: Guangdong Polytechnic of Water Resources and Electric Engineering, Guangzhou (CN)

(72) Inventors: Tie Li, Guangzhou (CN); Yimei Yuan, Guangzhou (CN)

(73) Assignee: Guangdong Polytechnic of Water Resources and Electric Engineering, Guangzhou (CN)

( * ) Notice: Subject to any disclaimer, the term of this patent is extended or adjusted under 35 U.S.C. 154(b) by 0 days.

(21) Appl. No.: 17/416,532

(22) PCT Filed: May 22, 2020

(86) PCT No.: PCT/CN2020/091849
§ 371 (c)(1),
(2) Date: Jun. 21, 2021

(87) PCT Pub. No.: WO2021/232416
PCT Pub. Date: Nov. 25, 2021

(65) Prior Publication Data
US 2023/0064296 A1 Mar. 2, 2023

(30) Foreign Application Priority Data
May 21, 2020 (CN) .......................... 202010435606.3

(51) Int. Cl.
*E02D 27/46* (2006.01)
*E02D 5/18* (2006.01)
(Continued)

(52) U.S. Cl.
CPC ............... *E02D 27/46* (2013.01); *E02D 5/18* (2013.01); *E02D 5/46* (2013.01); *E02D 19/04* (2013.01);
(Continued)

(58) Field of Classification Search
CPC ....... E02B 2201/00; E02D 27/46; E02D 5/18; E02D 5/46; E02D 19/04; E02D 2300/0018; E02D 2300/002
See application file for complete search history.

(56) References Cited

U.S. PATENT DOCUMENTS 1,624,330 A * 4/1927 Gerwick ................. E02D 27/20
405/222
4,820,080 A * 4/1989 Varkonyi ................ E02B 11/00
405/36
(Continued)

FOREIGN PATENT DOCUMENTS

CN 108166518 A 6/2018
CN 108277815 A 7/2018
(Continued)

*Primary Examiner* — Benjamin F Fiorello
(74) *Attorney, Agent, or Firm* — Hawaii Patent Services; Nathaniel K. Fedde; Kenton N. Fedde

(57) ABSTRACT

The present invention discloses a water intake pipeline structure passing through a soft foundation embankment below a flood level and a construction method. The water intake pipeline structure comprises: pipelines, a gate valve well, a concrete pipe bed, a high-pressure jet grouting pile continuous wall, cement deep mixing piles, geogrids, backfilling clay, a clay bound macadam and concrete key walls. After the embankment is broken and excavated to reach a pipeline embankment-passing design elevation, the cement deep mixing piles are fully disposed in a plum blossom type, and the high-pressure jet grouting pile continuous wall is disposed under the gate valve well. A plain concrete cushion layer, the gate valve well, the concrete key walls and the (Continued)

concrete pipe bed are poured, the water intake pipelines are installed, and the pipelines behind the gate valve well are wrapped with concrete. The geogrids are placed during clay backfilling, and layered soil filling is performed. An embankment top is restored by using the clay bound macadam. The gate valve well is provided with a gate valve, and an operating lever is connected onto the gate valve. The present invention further discloses the construction method of the water intake pipeline structure designed to pass through the soft foundation embankment below the flood level. The present invention can eliminate differential settlement of an embankment-passing section, cut off seepage channels in contact positions of the pipelines and the embankment body, and improve the anti-skid stability of an embankment slope, and meanwhile it is novel in structure and convenient to implement.

8 Claims, 3 Drawing Sheets

(51) Int. Cl.
*E02D 5/46* (2006.01)
*E02D 19/04* (2006.01)
*F16L 1/024* (2006.01)
*F16L 1/028* (2006.01)

(52) U.S. Cl.
CPC ............. *F16L 1/0243* (2013.01); *F16L 1/028* (2013.01); *E02D 2300/0018* (2013.01); *E02D 2300/002* (2013.01)

(56) References Cited

U.S. PATENT DOCUMENTS

| | | | |
|---|---|---|---|
| 10,718,096 B2* | 7/2020 | Li | E02D 17/205 |
| 11,124,937 B1* | 9/2021 | Gupta | E02D 27/16 |
| 11,802,389 B2* | 10/2023 | Li | E02B 11/00 |
| 2005/0042030 A1* | 2/2005 | Fu | E03F 5/046 |
| | | | 405/36 |
| 2010/0269929 A1* | 10/2010 | Dodds | E02B 9/06 |
| | | | 137/544 |
| 2023/0203775 A1* | 6/2023 | Lyu | E02D 17/12 |
| | | | 405/272 |

FOREIGN PATENT DOCUMENTS

| | | |
|---|---|---|
| CN | 110055929 A | 7/2019 |
| CN | 110241788 Y | 9/2019 |
| CN | 111119277 A | 5/2020 |
| CN | 212316981 U | 1/2021 |
| JP | 2013091923 A | 5/2013 |

* cited by examiner

WATER INTAKE PIPELINE STRUCTURE PASSING THROUGH SOFT FOUNDATION EMBANKMENT BELOW FLOOD LEVEL AND CONSTRUCTION METHOD

TECHNICAL FIELD

The present invention relates to the technical field of a water intake pipeline, and particularly relates to a water intake pipeline structure passing through a soft foundation embankment below a flood level and a construction method.

BACKGROUND ART

Water works often take water from riverways, and water intake pipelines must pass through an embankment, so that weak links are newly added to the embankment. In order to reduce the adverse effects on the embankment, the bottom of the pipe needs to be higher than a designed flood level of the embankment. When a water pump is disposed behind the embankment, an effective suction distance is generally only 5 to 6 m due to the restriction of atmospheric pressure and the influence of the water intake flow rate. When the flow rate is larger, the effective suction distance will be smaller. If the water level change amplitude of the river is great, and a difference value between a designed flood level and a normal water level exceeds 6 m, the water pump behind the embankment cannot take water from the riverway according to the designed flow rate. If a pump house is disposed in the riverway, the pump lift of the water pump can reach dozens of meters and even hundreds of meters, and thus the water can easily go over the embankment to directly reach the water works. However, a water-blocking area of the pump house in the riverway is large, and the flood discharge of the riverway will be influenced. If the pump house is disposed behind the embankment, and only a water intake opening is remained in the riverway, the water-blocking area can be greatly reduced, and the influence on the flood discharge of the riverway is small, but the bottom elevation of an embankment-passing pipeline needs to be reduced to enable the pipeline to pass below the designed flood level of the embankment.

If the pipeline passes through the embankment below the designed flood level, there is a contact flushing hidden hazard in a contact position of the pipeline and an embankment body, and there is also a damage and water leakage possibility in the pipeline, so that an obvious adverse effect is generated on both the seepage stability and the anti-skid stability of the embankment. When soft foundations such as silt exist under the embankment, differential settlement will be also caused, and even the embankment burst will occur, and the result will be unimaginable. Therefore, a water intake pipeline structure passing through a soft foundation embankment below a flood level and a construction method are provided for solving the above problems.

SUMMARY OF THE INVENTION

The objective of the present invention is to provide a water intake pipeline structure passing through a soft foundation embankment below a flood level and a construction method so as to solve the problems proposed in the above background art.

In order to achieve the above objective, the present invention provides the following technical solution: a water intake pipeline structure passing through a soft foundation embankment below a flood level includes a high-pressure jet grouting pile continuous wall. The high-pressure jet grouting pile continuous wall is poured in a digging pit near a water close side on a top of the embankment, a gate valve well is poured and disposed on the high-pressure jet grouting pile continuous wall, pipelines are fixedly sleeved and connected to inner cavities at two ends of the gate valve well, one ends of the pipelines pass through an outer wall of the gate valve well and are tightly attached to the high-pressure jet grouting pile continuous wall, the pipelines on the high-pressure jet grouting pile continuous wall are poured and wrapped in a concrete pipe bed, backfilling clay is filled on the high-pressure jet grouting pile continuous wall and side walls of the gate valve well, a clay bound macadam is laid on a top of the backfilling clay, one ends of the pipelines far away from the high-pressure jet grouting pile continuous wall extend to just above a slope toe of the water close side of the embankment, a pile frame is fixedly buried and disposed in the slope toe of the embankment, bottoms of end surfaces of the pipelines are fixedly welded onto the pile frame, and the end surfaces of the pipelines are fixedly provided with water intake openings.

In a preferred implementation case, a plurality of cement deep mixing piles are fixedly poured in the embankment at a bottom of the high-pressure jet grouting pile continuous wall, top surfaces of the cement deep mixing piles are fixedly connected with the bottom of the high-pressure jet grouting pile continuous wall, and a plain concrete cushion layer is poured in a soil pit at an edge of the high-pressure jet grouting pile continuous wall.

In a preferred implementation case, bottoms of the cement deep mixing piles extend to 2 m below an embankment foundation soft soil layer, the cement deep mixing piles are fully disposed in a plum blossom type with a spacing of 1.2 m*1.2 m, and a distance from two sides of a region area of the cement deep mixing piles to an edge of the gate valve well is greater than 1 m.

In a preferred implementation case, the gate valve well includes a reinforced concrete bottom plate, the reinforced concrete bottom plate is fixedly poured on a top of one end of the high-pressure jet grouting pile continuous wall near the water close side of the embankment, concrete support seats are fixedly poured at four sides of the reinforced concrete bottom plate, gate valves are disposed at two ends of inner cavities of the concrete support seats, the gate valves pass through the pipelines of the concrete support seats, and gate valve operating levers are disposed on tops of the gate valves.

In a preferred implementation case, concrete key walls are integrally poured at two sides of the reinforced concrete bottom plate and the concrete support seats, and through holes for sleeving and connecting the pipelines are formed in outer walls of two ends of the concrete support seats.

In a preferred implementation case, the concrete pipe bed is of a terraced structure with a wider lower portion and a narrower upper portion, a compaction degree of the backfilling clay is greater than 0.95, and a layer of geogrids 5 are laid every 0.5 m thick soil layer in the backfilling clay.

In a preferred implementation case, a plurality of steel pipe piles are fixedly buried and disposed on the embankment between the pile frame and the gate valve well, tops of the steel pipe piles are all tightly supported on bottom surfaces of the pipelines, a gabion pad is laid on the slope toe of the embankment at bottoms of the water intake openings, a gravel leveling layer is laid on the gabion pad, and the gravel leveling layer is located just below the water intake openings.

A construction method of the water intake pipeline structure passing through a soft foundation embankment below a flood level includes the following steps:

1) setting a soil cofferdam to a design elevation along the slope toe of the embankment, laying an anti-seepage geomembrane on a slope surface of a water close side of the soil cofferdam, performing top pressing protection outside the geomembrane by using sand bags, and pumping all accumulated water between the soil cofferdam and a slope top of the embankment;
2) when a slope top earth embankment of the embankment reaches the design elevation, performing slope setting at two sides according to a slope ratio of 1:3 to form an installing pit;
3) disposing cement deep mixing piles at a bottom of the installing pit;
4) disposing a row of high-pressure jet grouting pile continuous wall parallel to an embankment axial line on tops of the cement deep mixing piles, and disposing the gate valve well at the water close side of the high-pressure jet grouting pile continuous wall;
5) leveling a horizontal excavation face, and pouring the plain concrete cushion layer;
6) pouring the reinforced concrete bottom plate, the concrete support seats and the concrete key walls at two sides of the gate valve well, and reserving accesses of the pipelines in upstream and downstream faces of the gate valve well;
7) pouring the concrete pipe bed behind the gate valve well, and using a cross section with a wider lower portion and a narrower upper portion;
8) passing the pipelines through the gate valve well, enabling the pipelines behind the gate valve well to be on the concrete pipe bed and to be wrapped and coated by concrete, then, installing the gate valves and the gate valve operating levers, and performing effective water stop in the gate valve well;
9) filling an embankment body with the backfilling clay on the high-pressure jet grouting pile continuous wall and the side walls of the gate valve well, and disposing the geogrids at intervals;
10) laying the clay bound macadam on the top of the backfilling clay;
11) dismounting the soil cofferdam, then, fixedly burying a plurality of steel pipe piles on a water close side wall of the embankment, and fixedly burying a pile frame at a slope bottom of the embankment;
12) erecting the pipelines at the steel pipe piles, enabling end surfaces of one ends of the pipelines to be supported on the pile frame and fixedly provided with the downward water intake openings, and enabling the other ends of the pipelines to be connected with the pipelines inside the gate valve well at the embankment body; and
13) laying the gabion pad at the slope bottom of the embankment near the water intake openings, laying the gravel leveling layer on the gabion pad, and enabling the gravel leveling layer to be located just below the water intake openings.

Compared with the prior art, the present invention has the following beneficial effects:

1. The gate valves in the gate valve well can fast cut off the waterflow in the pipelines under the sudden emergency conditions.
2. The concrete key walls at two sides of the gate valve well can increase waterflow seepage paths and reduce hydraulic gradients, and are favorable for protecting embankment body filled soil from contact flushing.
3. The embankment foundation soft soil layer in the pipe passing position uses the cement deep mixing piles for reinforcement, and the differential settlement of the embankment foundation is reduced.
4. The high-pressure jet grouting pile continuous wall is used under the gate valve well, and the anti-seepage performance of the embankment foundation is improved.
5. The concrete pipe bed is used behind the gate valve well, the cross section with the wider lower portion and the narrower upper portion is used, an acute angle is avoided, and the backfilling clay can be favorably compacted.
6. The geogrids can greatly eliminate the differential settlement of the backfilling clay and improve the anti-skid stability of an embankment slope.
7. The clay bound macadam disposed at the embankment top is favorable for observing the differential settlement of the embankment top to timely discover abnormal phenomena such as cracks.
8. The gabion pad is used for protecting a river bed near the water intake openings, and is favorable for river bed stability.
9. Gravels under the water intake openings are favorable for preventing mud and sand from being sucked into the water intake openings.

In the figures, 1 denotes a pipeline, 2 denotes a gate valve well, 201 denotes a reinforced concrete bottom plate, 202 denotes a concrete support seat, 203 denotes a gate valve, 204 denotes a gate valve operating lever, 3 denotes a concrete pipe bed, 4 denotes a high-pressure jet grouting pile continuous wall, 401 denotes a cement deep mixing pile, 5 denotes a geogrid, 6 denotes backfilling clay, 7 denotes a clay bound macadam, 8 denotes a plain concrete cushion layer, 9 denotes a concrete key wall, 10 denotes a steel pipe pile, 11 denotes a water intake opening, 12 denotes a gabion pad, 13 denotes a gravel leveling layer, 14 denotes a pile frame, 15 denotes a soil cofferdam, 16 denotes a geomembrane, and 17 denotes a sand bag.

DETAILED DESCRIPTION OF THE INVENTION

The technical solutions in embodiments of the present invention will be clearly and completely described below with reference to the accompanying drawings in the embodiments of the present invention, and it is obvious that the described embodiments are only a part of the embodiments of the present invention, and not all of the embodiments. All other embodiments obtained by those of ordinary skill in the art on the basis of the embodiments in the present invention without making any creative effort shall fall within the protection scope of the present invention.

Figure 1:
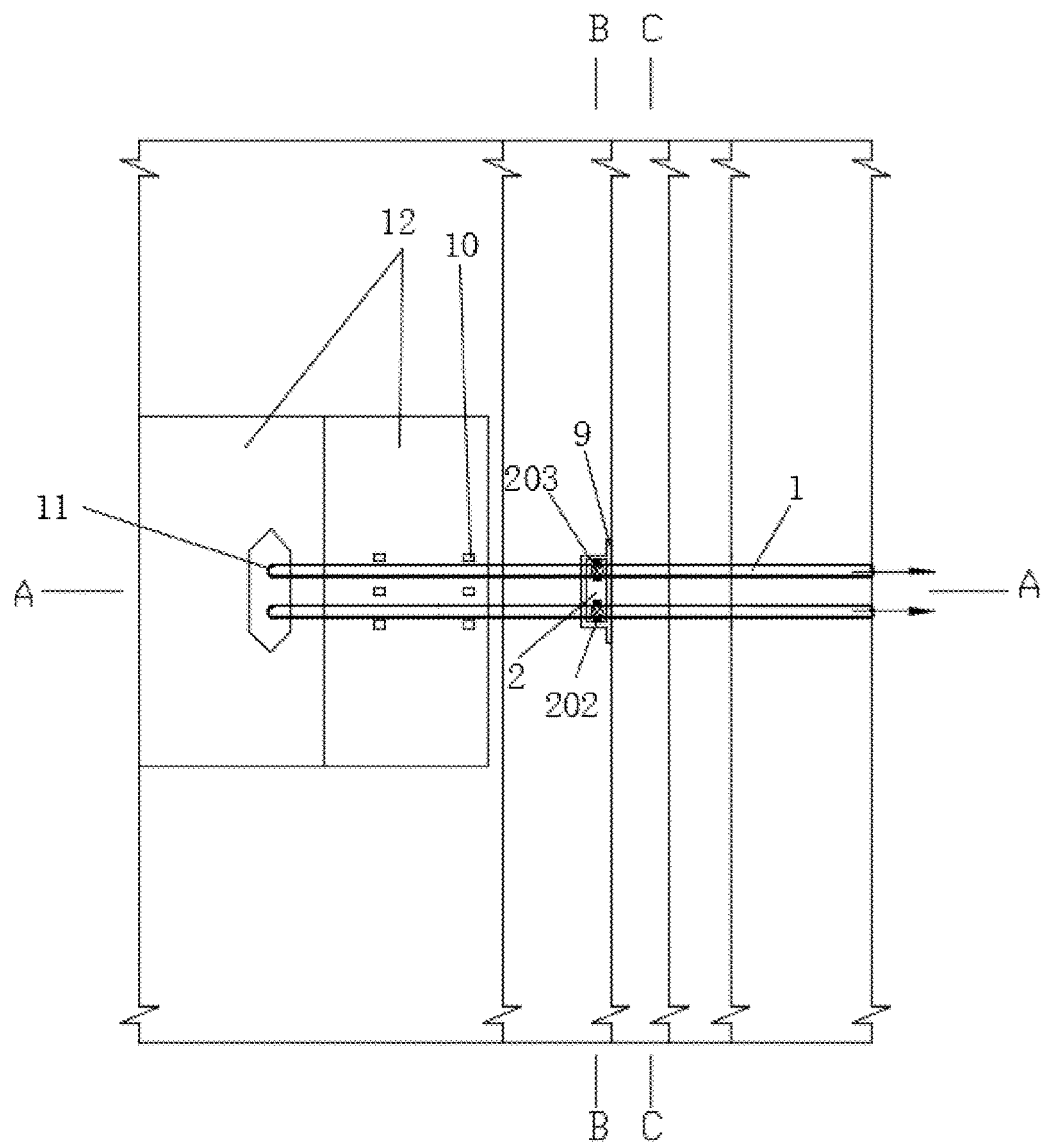
FIG. 1 is a schematic structure diagram of the present invention.
Figure 2:
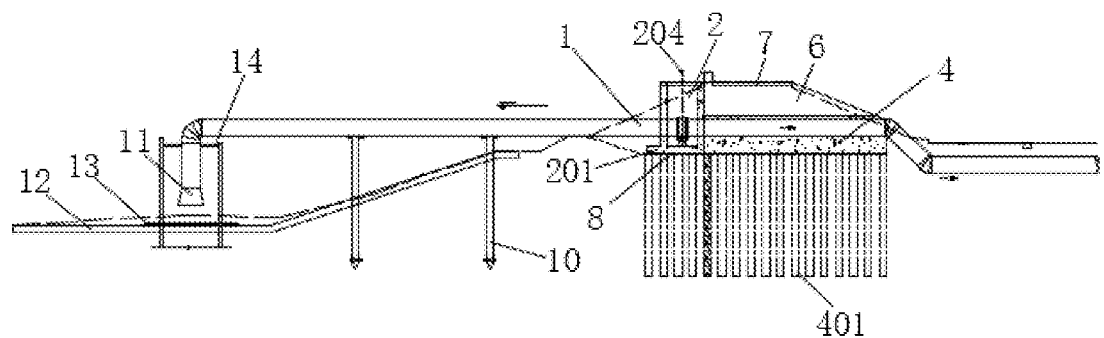
FIG. 2 is a longitudinal sectional view (AA sectional view) along pipelines in FIG. 1 of the present invention.
Figure 3:
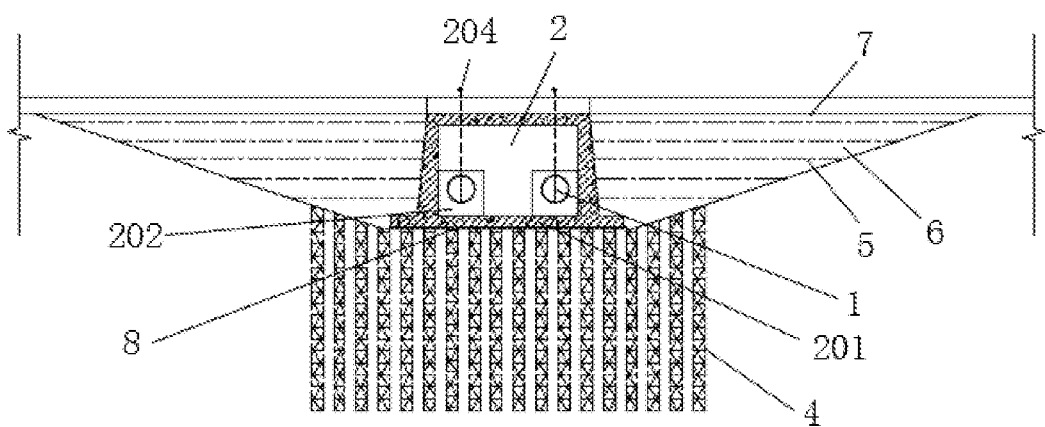
FIG. 3 is a cross sectional view (BB sectional view) perpendicular to the pipelines at a gate valve well in FIG. 1 of the present invention.
Figure 4:
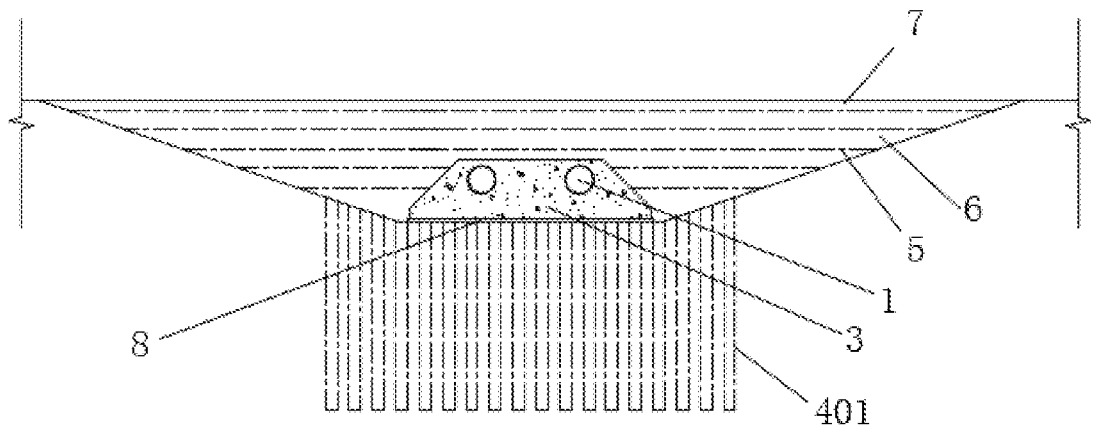
FIG. 4 is a cross sectional view (CC sectional view) perpendicular to the pipelines at a pipe bed section in FIG. 1 of the present invention.
Figure 5:
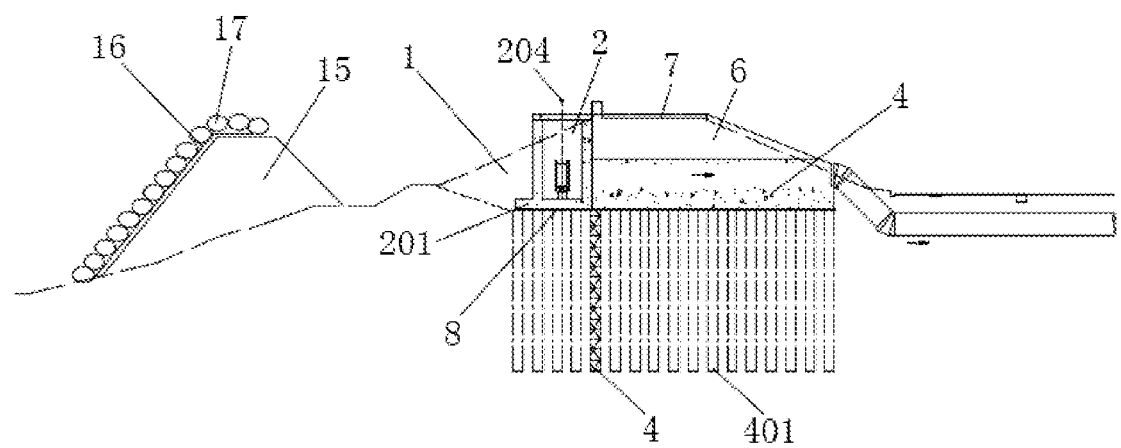
FIG. 5 is a construction plane layout plan of the present invention.

Refer to FIGS. 1 to 5, the present invention provides a technical solution: a water intake pipeline structure passing through a soft foundation embankment below a flood level includes a high-pressure jet grouting pile continuous wall 4. The high-pressure jet grouting pile continuous wall 4 is poured in a digging pit near a water close side on a top of the embankment, a gate valve well 2 is poured and disposed on the high-pressure jet grouting pile continuous wall 4, pipelines 1 are fixedly sleeved and connected to inner cavities at two ends of the gate valve well 2, one ends of the pipelines 1 pass through an outer wall of the gate valve well 2 and are tightly attached to the high-pressure jet grouting pile continuous wall 4, the pipelines 1 on the high-pressure jet grouting pile continuous wall 4 are poured and wrapped in a concrete pipe bed 3, backfilling clay 6 is filled on the high-pressure jet grouting pile continuous wall 4 and side walls of the gate valve well 2, a clay bound macadam 7 is laid on a top of the backfilling clay 6, one ends of the pipelines 1 far away from the high-pressure jet grouting pile continuous wall 4 extend to just above a slope toe of the water close side of the embankment, a pile frame 14 is fixedly buried and disposed in the slope toe of the embankment, bottoms of end surfaces of the pipelines 1 are fixedly welded onto the pile frame 14, and the end surfaces of the pipelines 1 are fixedly provided with water intake openings 11.

A plurality of cement deep mixing piles 401 are fixedly poured in the embankment at a bottom of the high-pressure jet grouting pile continuous wall 4, top surfaces of the cement deep mixing piles 401 are fixedly connected with the bottom of the high-pressure jet grouting pile continuous wall 4, and a plain concrete cushion layer 8 is poured in a soil pit at an edge of the high-pressure jet grouting pile continuous wall 4. An embankment foundation soft soil layer is reinforced by the cement deep mixing piles 401, so that the differential settlement of the embankment foundation is reduced. The high-pressure jet grouting pile continuous wall 4 is used under the gate valve well 2, so that the anti-seepage performance of the embankment foundation is improved.

Bottoms of the cement deep mixing piles 401 extend to 2 m below the embankment foundation soft soil layer, the cement deep mixing piles 401 are fully disposed in a plum blossom type with a spacing of 1.2 m*1.2 m, and a distance from two sides of a region area of the cement deep mixing piles 401 to an edge of the gate valve well 2 is greater than 1 m.

The gate valve well 2 includes a reinforced concrete bottom plate 201, the reinforced concrete bottom plate 201 is fixedly poured on a top of one end of the high-pressure jet grouting pile continuous wall 4 near the water close side of the embankment, concrete support seats 202 are fixedly poured at four sides of the reinforced concrete bottom plate 201, gate valves 203 are disposed at two ends of inner cavities of the concrete support seats 202, the gate valves 203 pass through the pipelines 1 of the concrete support seats 202, and gate valve operating levers 204 are disposed on tops of the gate valves 203.

Concrete key walls 9 are integrally poured at two sides of the reinforced concrete bottom plate 201 and the concrete support seats 202. The concrete key walls 9 may increase waterflow seepage paths and reduce hydraulic gradients, and are favorable for protecting embankment body filled soil from contact flushing. Through holes for sleeving and connecting the pipelines 1 are formed in outer walls of two ends of the concrete support seats 202.

In a preferred implementation case, the concrete pipe bed 3 is of a terraced structure with a wider lower portion and a narrower upper portion, an acute angle is avoided, and the backfilling clay can be favorably compacted. A compaction degree of the backfilling clay 6 is greater than 0.95, and a layer of geogrids 5 are laid every 0.5 m thick soil layer in the backfilling clay 6. The geogrids 5 may greatly eliminate the differential settlement of the backfilling clay 6 and improve the anti-skid stability of an embankment slope.

In a preferred implementation case, a plurality of steel pipe piles 10 are fixedly buried and disposed on the embankment between the pile frame 14 and the gate valve well 2, tops of the steel pipe piles 10 are all tightly supported on bottom surfaces of the pipelines 1, a gabion pad 12 is laid on the slope toe of the embankment at bottoms of the water intake openings 11, a gravel leveling layer 13 is laid on the gabion pad 12, and the gravel leveling layer 13 is located just below the water intake openings 11. The gabion pad 12 is used for protection, and is favorable for river bed stability. Gravels under the water intake openings 11 effectively prevent mud and sand from being sucked into the water intake openings.

A construction method of the water intake pipeline structure passing through a soft foundation embankment below a flood level includes the following steps:

1) setting a soil cofferdam 15 to a design elevation along the slope toe of the embankment, laying an anti-seepage geomembrane 16 on a slope surface of a water close side of the soil cofferdam 15, performing top pressing protection outside the geomembrane 16 by using sand bags 17, and pumping all accumulated water between the soil cofferdam 15 and a slope top of the embankment;

2) when a slope top earth embankment of the embankment reaches the design elevation, performing slope setting at two sides according to a slope ratio of 1:3 to form an installing pit;

3) disposing cement deep mixing piles 401 at a bottom of the installing pit;

4) disposing a row of high-pressure jet grouting pile continuous wall 4 parallel to an embankment axial line on tops of the cement deep mixing piles 401, and disposing the gate valve well 2 at the water close side of the high-pressure jet grouting pile continuous wall 4;

5) leveling a horizontal excavation face, and pouring the plain concrete cushion layer 8;

6) pouring the reinforced concrete bottom plate 201, the concrete support seats 202 and the concrete key walls 9 at two sides of the gate valve well 2, and reserving accesses of the pipelines 1 in upstream and downstream faces of the gate valve well 2;

7) pouring the concrete pipe bed 3 behind the gate valve well 2, and using a cross section with a wider lower portion and a narrower upper portion;

8) passing the pipelines 1 through the gate valve well 2, enabling the pipelines 1 behind the gate valve well 2 to be on the concrete pipe bed 3 and to be wrapped and coated by concrete, then, installing the gate valves 203 and the gate valve operating levers 204, and performing effective water stop in the gate valve well 2;

9) filling an embankment body with the backfilling clay 6 on the high-pressure jet grouting pile continuous wall 4 and the side walls of the gate valve well 2, and disposing the geogrids 5 at intervals;

10) laying the clay bound macadam 7 on the top of the backfilling clay 6;
11) dismounting the soil cofferdam 15, then, fixedly burying a plurality of steel pipe piles 10 on a water close side wall of the embankment, and fixedly burying a pile frame 14 at a slope bottom of the embankment;
12) erecting the pipelines 1 at the steel pipe piles 10, enabling end surfaces of one ends of the pipelines 1 to be supported on the pile frame 14 and fixedly provided with the downward water intake openings 11, and enabling the other ends of the pipelines 1 to be connected with the pipelines 1 inside the gate valve well 2 at the embankment body; and
13) laying the gabion pad 12 at the slope bottom of the embankment near the water intake openings 11, laying the gravel leveling layer 13 on the gabion pad 12, and enabling the gravel leveling layer 13 to be located just below the water intake openings 11.

Working principles: The present invention performs water proofing on the embankment slope top through the soil cofferdam 15, so that the embankment slope top is exposed out of the water surface, and the construction is convenient. By excavating the top of the embankment and burying the plurality of cement deep mixing piles 401, the top surfaces of the cement deep mixing piles 401 are fixedly connected with the bottom of the high-pressure jet grouting pile continuous wall 4, the plain concrete cushion layer 8 is poured in the soil pit at the edge of the high-pressure jet grouting pile continuous wall 4, and the embankment foundation soft soil layer uses the cement deep mixing piles 401 for reinforcement, so that the differential settlement of the embankment foundation is reduced. The high-pressure jet grouting pile continuous wall 4 is used under the gate valve well 2, so that the anti-seepage performance of the embankment foundation is improved. At the same time, the concrete key walls 9 are integrally poured at two sides of the reinforced concrete bottom plate 201 and the concrete support seats 202, and the concrete key walls 9 can increase waterflow seepage paths and reduce hydraulic gradients, and are favorable for protecting embankment body filled soil from contact flushing. After the pipelines 1 are connected with the gate valve well 2, the pipelines 1 at the back end of the gate valve well 2 are supported and fixed through the concrete pipe bed 3, the concrete pipe bed 3 is of a terraced structure with a wider lower portion and a narrower upper portion, an acute angle is avoided, and the digging pit on the top of the embankment can be favorably filled with and compacted through the backfilling clay 6. Furthermore, the geogrids 5 laid in the backfilling clay 6 can greatly eliminate the differential settlement of the backfilling clay and improve the anti-skid stability of an embankment slope, so that the water intake pipelines can be effectively installed on the soft foundation embankment, and the stability of the embankment is ensured. The gabion pad 12 is used for protecting a river bed near the water intake openings 11, and is favorable for river bed stability. Gravels under the water intake openings 11 effectively prevent mud and sand from being sucked into the water intake openings 11, and the water intake is facilitated.

Although the embodiments of the present invention have been shown and described, it will be understood by those of ordinary skill in the art that various changes, modifications, substitutions and alterations may be made to these embodiments without departing from the principles and spirit of the present invention, and the scope of the present invention is defined by the appended claims and their equivalents.

What is claimed is:

1. A water intake pipeline structure passing through a soft foundation embankment below a flood level, comprising a high-pressure jet grouting pile continuous wall (4), wherein the high-pressure jet grouting pile continuous wall (4) is poured in a digging pit near a water close side on a top of the embankment, a gate valve well (2) is poured and disposed on the high-pressure jet grouting pile continuous wall (4), pipelines (1) are fixedly sleeved and connected to inner cavities at two ends of the gate valve well (2), one ends of the pipelines (1) pass through an outer wall of the gate valve well (2) and are tightly attached to the high-pressure jet grouting pile continuous wall (4), the pipelines (1) on the high-pressure jet grouting pile continuous wall (4) are poured and wrapped in a concrete pipe bed (3), backfilling clay (6) is filled on the high-pressure jet grouting pile continuous wall (4) and side walls of the gate valve well (2), a clay bound macadam (7) is laid on a top of the backfilling clay (6), one ends of the pipelines (1) far away from the high-pressure jet grouting pile continuous wall (4) extend to just above a slope toe of the water close side of the embankment, a pile frame (14) is fixedly buried and disposed in the slope toe of the embankment, bottoms of end surfaces of the pipelines (1) are fixedly welded onto the pile frame (14), and the end surfaces of the pipelines (1) are fixedly provided with water intake openings (11).

2. The water intake pipeline structure passing through a soft foundation embankment below a flood level according to claim 1, wherein a plurality of cement deep mixing piles (401) are fixedly poured in the embankment at a bottom of the high-pressure jet grouting pile continuous wall (4), top surfaces of the cement deep mixing piles (401) are fixedly connected with the bottom of the high-pressure jet grouting pile continuous wall (4), and a plain concrete cushion layer (8) is poured in a soil pit at an edge of the high-pressure jet grouting pile continuous wall (4).

3. The water intake pipeline structure passing through a soft foundation embankment below a flood level according to claim 2, wherein bottoms of the cement deep mixing piles (401) extend to 2 m below an embankment foundation soft soil layer, the cement deep mixing piles (401) are fully disposed in a plum blossom type with a spacing of 1.2 m*1.2 m, and a distance from two sides of a region area of the cement deep mixing piles (401) to an edge of the gate valve well (2) is greater than 1 m.

4. The water intake pipeline structure passing through a soft foundation embankment below a flood level according to claim 1, wherein the gate valve well (2) comprises a reinforced concrete bottom plate (201), the reinforced concrete bottom plate (201) is fixedly poured on a top of one end of the high-pressure jet grouting pile continuous wall (4) near the water close side of the embankment, concrete support seats (202) are fixedly poured at four sides of the reinforced concrete bottom plate (201), gate valves (203) are disposed at two ends of inner cavities of the concrete support seats (202), the gate valves (203) pass through the pipelines (1) of the concrete support seats (202), and gate valve operating levers (204) are disposed on tops of the gate valves (203).

5. The water intake pipeline structure passing through a soft foundation embankment below a flood level according to claim 4, wherein concrete key walls (9) are integrally poured at two sides of the reinforced concrete bottom plate (201) and the concrete support seats (202), and through holes for sleeving and connecting the pipelines (1) are formed in outer walls of two ends of the concrete support seats (202).

6. The water intake pipeline structure passing through a soft foundation embankment below a flood level according to claim 1, wherein the concrete pipe bed (3) is of a terraced structure with a wider lower portion and a narrower upper portion, a compaction degree of the backfilling clay (6) is greater than 0.95, and a layer of geogrids (5) are laid every 0.5 m thick soil layer in the backfilling clay (6).

7. The water intake pipeline structure passing through a soft foundation embankment below a flood level according to claim 1, wherein a plurality of steel pipe piles (10) are fixedly buried and disposed on the embankment between the pile frame (14) and the gate valve well (2), tops of the steel pipe piles (10) are all tightly supported on bottom surfaces of the pipelines (1), a gabion pad (12) is laid on the slope toe of the embankment at bottoms of the water intake openings (11), a gravel leveling layer (13) is laid on the gabion pad (12), and the gravel leveling layer (13) is located just below the water intake openings (11).

8. A construction method of the water intake pipeline structure passing through a soft foundation embankment below a flood level according to claim 1, comprising the following steps:

1) Setting a soil cofferdam (15) to a design elevation along the slope toe of the embankment, laying an anti-seepage geomembrane (16) on a slope surface of a water close side of the soil cofferdam (15), performing top pressing protection outside the geomembrane (16) by using sand bags (17), and pumping all accumulated water between the soil cofferdam (15) and a slope top of the embankment;

2) When a slope top earth embankment of the embankment reaches the design elevation, performing slope setting at two sides according to a slope ratio of 1:3 to form an installing pit;

3) Disposing cement deep mixing piles (401) at a bottom of the installing pit;

4) Disposing a row of high-pressure jet grouting pile continuous wall (4) parallel to an embankment axial line on tops of the cement deep mixing piles (401), and disposing the gate valve well (2) at the water close side of the high-pressure jet grouting pile continuous wall (4);

5) Leveling a horizontal excavation face, and pouring the plain concrete cushion layer (8);

6) Pouring the reinforced concrete bottom plate (201), the concrete support seats (202) and the concrete key walls (9) at two sides of the gate valve well (2), and reserving accesses of the pipelines (1) in upstream and downstream faces of the gate valve well (2);

7) Pouring the concrete pipe bed (3) behind the gate valve well (2), and using a cross section with a wider lower portion and a narrower upper portion;

8) Passing the pipelines (1) through the gate valve well (2), enabling the pipelines (1) behind the gate valve well (2) to be on the concrete pipe bed (3) and to be wrapped and coated by concrete, then, installing the gate valves (203) and the gate valve operating levers (204), and performing effective water stop in the gate valve well (2);

9) filling an embankment body with the backfilling clay (6) on the high-pressure jet grouting pile continuous wall (4) and the side walls of the gate valve well (2), and disposing the geogrids (5) at intervals;

10) laying the clay bound macadam (7) on the top of the backfilling clay (6);

11) dismounting the soil cofferdam (15), then, fixedly burying a plurality of steel pipe piles (10) on a water close side wall of the embankment, and fixedly burying a pile frame (14) at a slope bottom of the embankment;

12) erecting the pipelines (1) at the steel pipe piles (10), enabling end surfaces of one ends of the pipelines (1) to be supported on the pile frame (14) and fixedly provided with the downward water intake openings (11), and enabling the other ends of the pipelines (1) to be connected with the pipelines (1) inside the gate valve well (2) at the embankment body; and 13) laying the gabion pad (12) at the slope bottom of the embankment near the water intake openings (11), laying the gravel leveling layer (13) on the gabion pad (12), and enabling the gravel leveling layer (13) to be located just below the water intake openings (11).

\* \* \* \* \*